United States Patent
Schlieman

(10) Patent No.: US 10,779,524 B2
(45) Date of Patent: Sep. 22, 2020

(54) FISHING ICE HOLE FUNNEL APPARATUS

(71) Applicant: Thomas Schlieman, Richmond, MN (US)

(72) Inventor: Thomas Schlieman, Richmond, MN (US)

(*) Notice: Subject to any disclaimer, the term of this patent is extended or adjusted under 35 U.S.C. 154(b) by 185 days.

(21) Appl. No.: 16/156,682

(22) Filed: Oct. 10, 2018

(65) Prior Publication Data

US 2020/0113163 A1    Apr. 16, 2020

(51) Int. Cl.
*A01K 97/01* (2006.01)
*F25C 5/14* (2006.01)

(52) U.S. Cl.
CPC ............ *A01K 97/01* (2013.01); *F25C 5/14* (2013.01)

(58) Field of Classification Search
CPC . A01K 97/01; F25C 5/14; E21B 7/008; E21B 10/32
USPC ............... 43/4; 175/18, 285; 299/25
See application file for complete search history.

(56) References Cited

U.S. PATENT DOCUMENTS

| | | | |
|---|---|---|---|
| 1,970,063 A | 8/1934 | Steinman | |
| 3,299,970 A * | 1/1967 | Anderson | A01K 97/01 175/18 |
| 3,336,989 A | 8/1967 | Henderson | |
| 3,397,750 A | 8/1968 | Wicklund | |
| 3,749,184 A | 7/1973 | Andeen | |
| 4,819,744 A | 4/1989 | Caswell | |
| 5,873,419 A * | 2/1999 | Berry | A01K 97/01 175/18 |
| 5,950,738 A * | 9/1999 | Caswell | A01K 97/01 175/18 |
| 2016/0010393 A1 * | 1/2016 | Ivan, Sr. | A01K 97/01 175/18 |

* cited by examiner

*Primary Examiner* — Darren W Ark
*Assistant Examiner* — Brady W Frazier
(74) *Attorney, Agent, or Firm* — Johnson and Phung LLC; Thomas N. Phung

(57) ABSTRACT

The present invention comprises a fishing ice hole flaring apparatus having a triangle-shaped base that that includes a pair of hinged arms each having a cutting blade attached thereto, a central shaft having a first end and a second end, the central shaft extending through the apex region of the triangle-shaped base proximal the first end, a pair of retraction cable attached to a portion of their corresponding hinged arms, a cable housing attached to a portion of the central shaft and running parallel to the central shaft and supporting a portion of each of the retraction cables therein, a cable retraction knob attached to the first ends of the retraction cables, the cable retraction knob operable to move the pivotably move the hinges arms between a retracted position and an in use position, and a z-shaped cranking handle system manually rotatably power the apparatus.

17 Claims, 5 Drawing Sheets

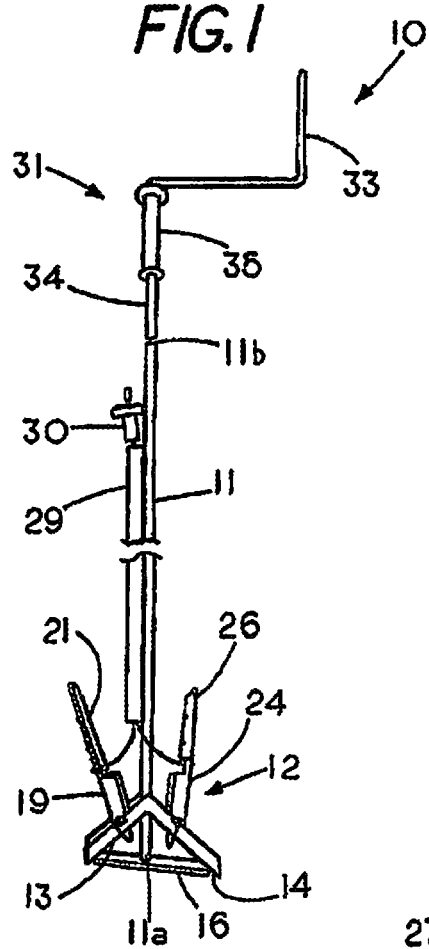
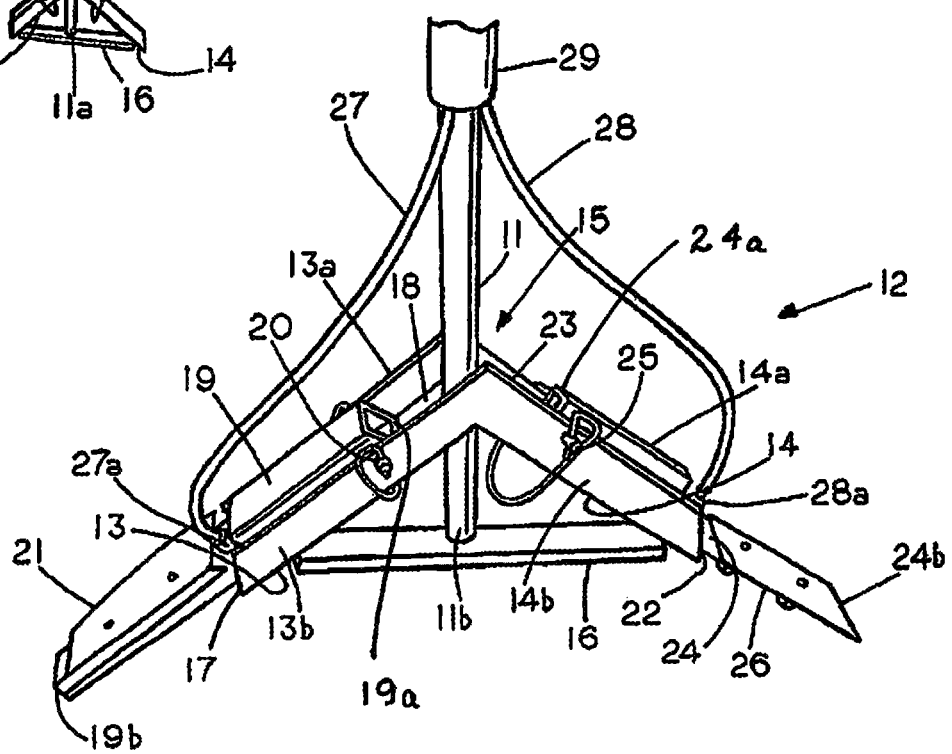

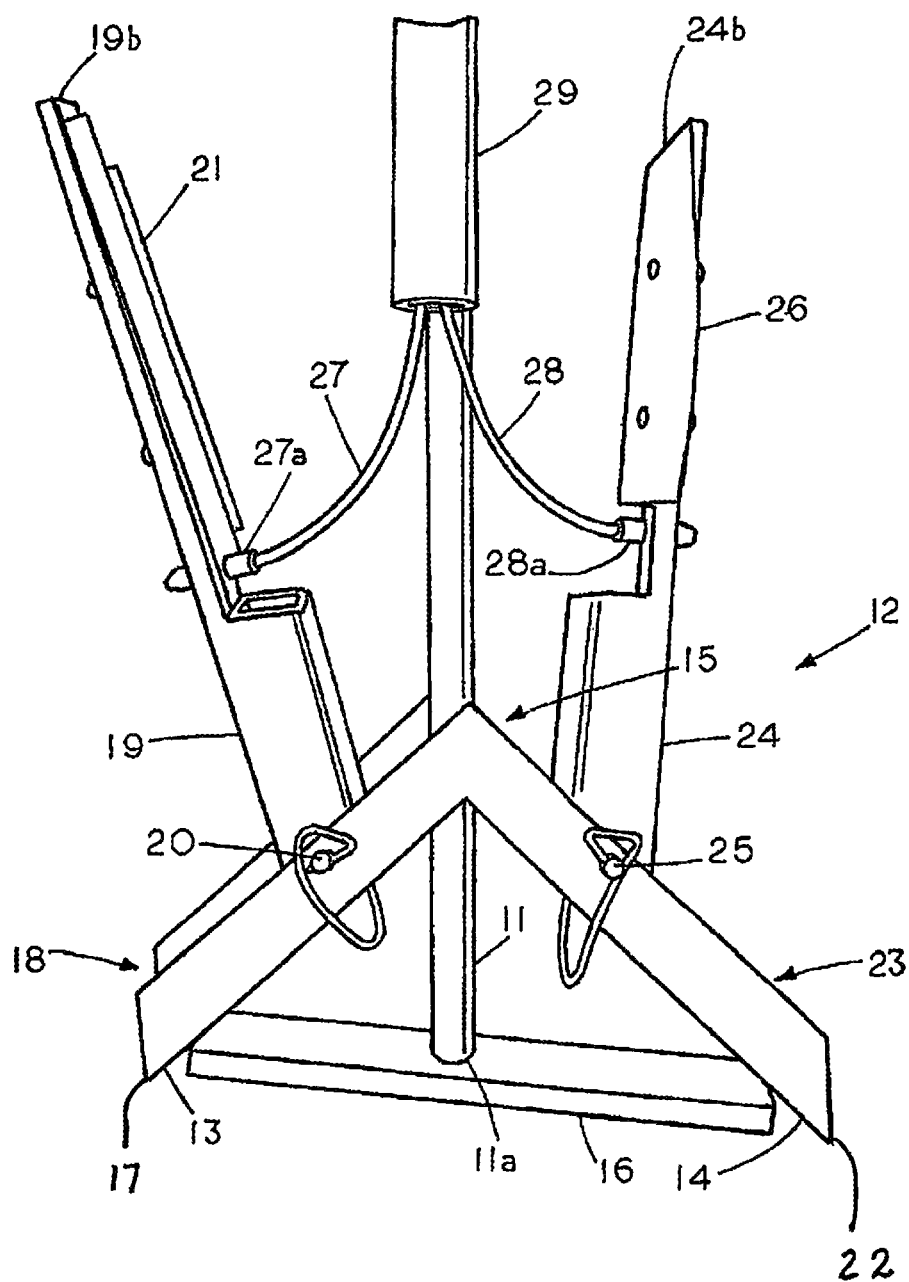

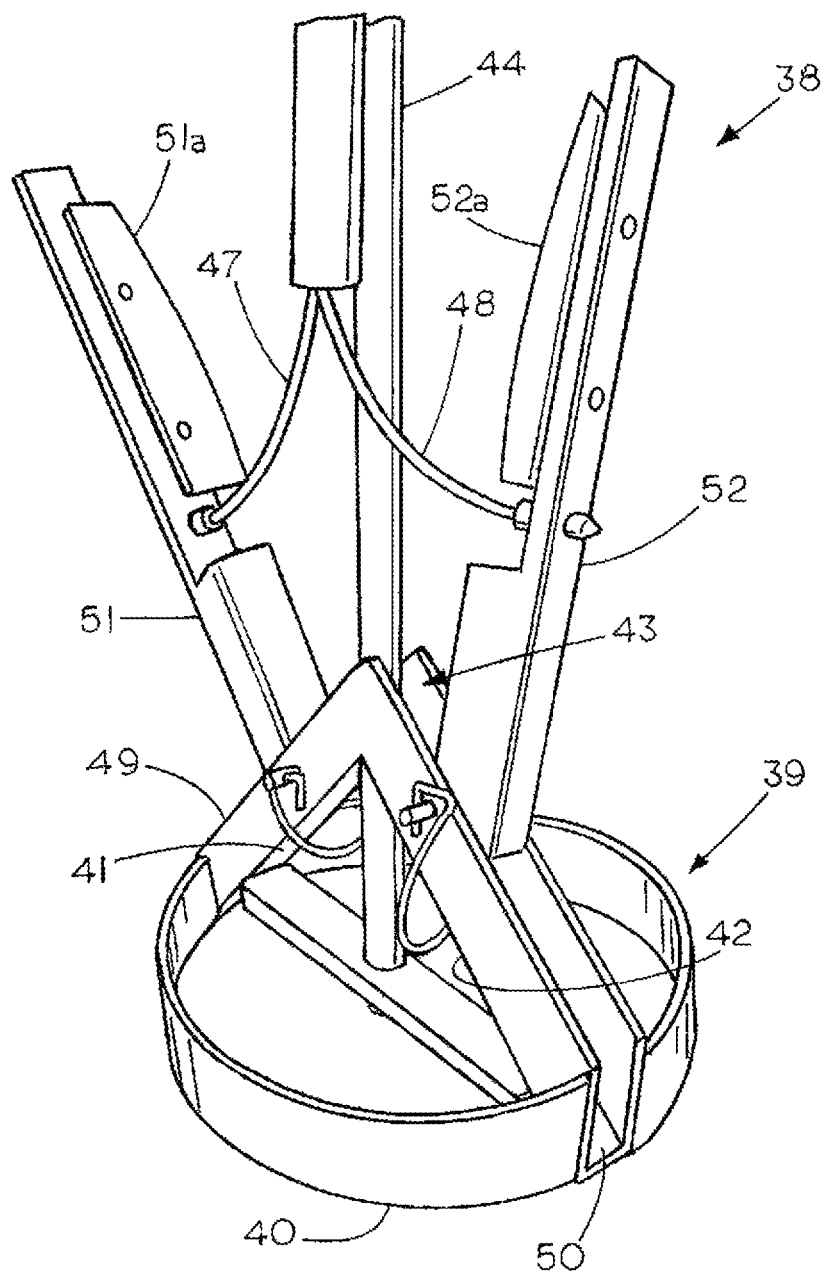

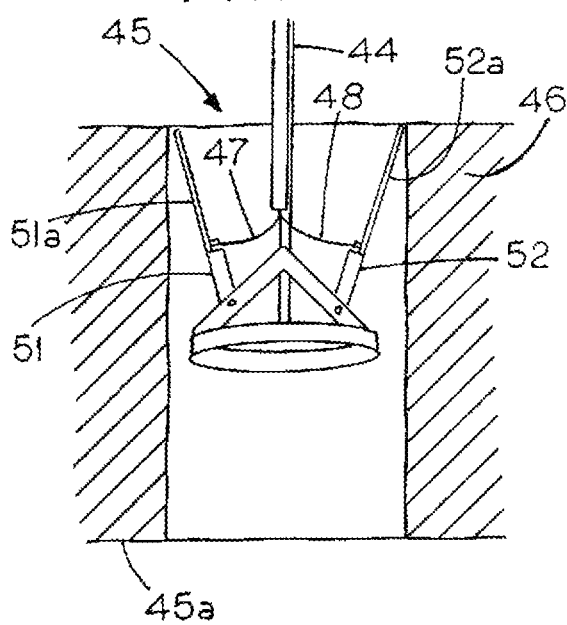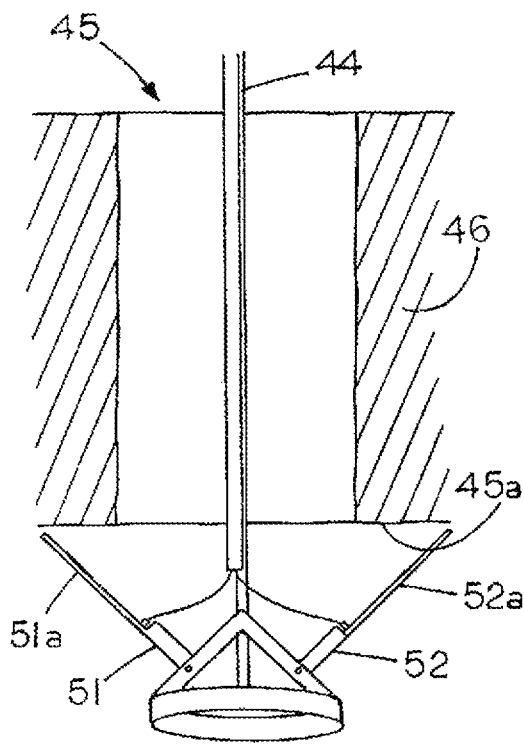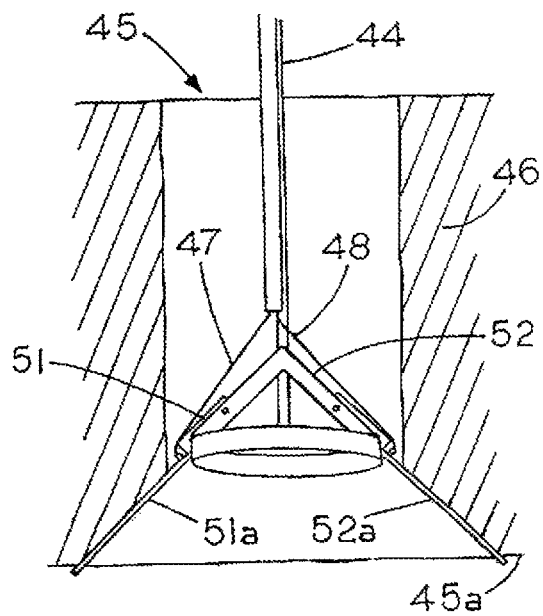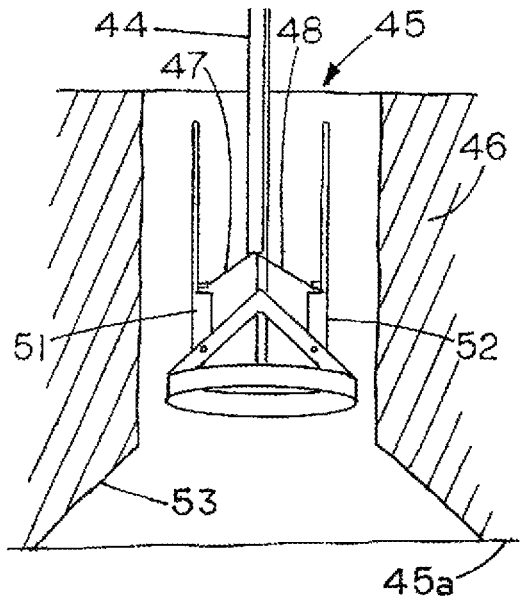

FISHING ICE HOLE FUNNEL APPARATUS

FIELD OF THE INVENTION

This invention relates generally to ice fishing and, more specifically to a tool used to form a flare at a bottom end of an ice fishing hole.

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

The use of hand drive and machine powered ice fishing augers for cutting ice fishing hole on frozen lakes and rivers are well known in the art. Ice fishing augers generally function by cutting a cylindrical hole through the ice of the frozen body of water to allow fishermen access to the unfrozen lake water and thereby access to the fishes. Although ice augers work for their intended purpose, one of the problems with fishing ice holes formed by the ice auger is that the ice augers, forms a sharp, edge on both ends of the fishing ice hole. Although having a shape edge at the top end of the fishing ice hole is of minor importance, have an sharp edge at the bottom end of the fishing ice hole may be problematic in that most fish that get off of an ice fisherman's hook occur at the bottom end of the fishing ice hole as the ice fisherman is attempting to retrieve the fish through the bottom end of the hole due to the fishing hook and line becoming potentially snagged by the sharp edge of the bottom end of the ice hole.

The present invention reduces or solves the above line and hook snagging problem by proving an improved tool that shaves and bevels a cone shape at the bottom end of pre-existing ice fishing holes.

SUMMARY OF THE INVENTION

Briefly, the present invention comprises a fishing ice hole flaring apparatus that includes an triangle-shaped base having a first side connected to a second side to form an apex region, and a third side comprising a weight-distributing cross arm further connecting the first side to the second side distal the apex region.

The first side of triangle-shaped base includes a pair of opposing side walls extending from at least a portion of an exterior surface of the first side to form a first U-shaped arm receiving channel. The first side of triangle-shaped base also includes a first hinged arm having a first end and a second end. A pivot pin locks the first hinged arm to the first U-shaped arm receiving channel proximal the first end of the first hinged arm and the second end of the first hinged arm to includes a cutting blade attached thereto.

Similarly, the second side of triangle-shaped base includes a pair of opposing side walls extending from at least a portion of an exterior surface of the second side to form a second U-shaped arm receiving channel. The second side of triangle-shaped base also includes a second hinged arm having a first end and a second end. A pivot pin locks the second hinged arm to the second U-shaped arm receiving channel proximal the first end of the second hinged arm and the second end of the second hinged arm includes a cutting blade attached thereto with the second blade facing the same circular direction as the first cutting blade.

The fishing ice hole flaring apparatus also includes a central shaft having a first end and a second end with the central shaft extending through the apex region of triangle-shaped base proximal the first end and secured to the weight-distributing cross arm at preferably a 90 degrees angle. The fishing ice hole flaring apparatus further includes first retraction cable and a second retraction cable each having a first end and a second end with the first end of the first retraction cable attached to a portion of the first hinged arm and the first end of the second retraction cable attached to a portion of the second hinged arm. A cable housing attached to a portion of the central shaft and running parallel to the central shaft supports a portion of each of the retraction cables therein. Attached to and connected the second ends of the retraction cables is a cable retraction knob, which is operable to pivotably move the hinged arms between a retracted position and an in use cutting position.

The fishing ice hole flaring apparatus may also include a z-shaped cranking handle system having main body, a cranking handle extending in a perpendicular direction from the main body and a connection handle extending from the main body in a direction opposite the cranking handle with the connection handle having a free end detachably connected to the second end of the central shaft. The z-shaped cranking handle system may include a hand supporting sleeve located about a portion of the connection handle with the hand supporting sleeve having an upward applied force supporting enlarged end with the enlarged end including a friction reducing rigid end surface for engaging a portion of the main body.

The fishing ice hole flaring apparatus may further include a centrifugal force balancing and centering ring connected to the first and second sides of the base distal the apex region with the centering ring functioning to automatically center fishing ice hole flaring apparatus during use in shaving and beveling a cone shape to a bottom end of a pre-existing ice fishing hole.

BRIEF DESCRIPTION OF THE DRAWINGS

FIG. 1 is a perspective view showing an embodiment of the present invention comprising a fishing ice hole flaring apparatus;

FIG. 2 is a close-up perspective view showing triangular shaped base in an in-use cutting position;

FIG. 3 is a close-up perspective view showing triangular shaped base in a retracted position;

FIG. 6 is a close-up perspective view of the fishing ice hole flaring apparatus of FIG. 5 in a retracted position cutting position;

FIG. 7A is a partial cross-sectional view showing the use the fishing ice hole flaring apparatus of FIGS. 5 and 6 in the retracted position being lowered to a bottom end of an ice fishing hole;

FIG. 7B is a partial cross-sectional view showing a triangular shaped base of the fishing ice hole flaring apparatus of FIGS. 5 and 6 lowered below a bottom surface of the ice fishing hole and subsequently opening to the cutting and beveling position;

FIG. 7C is a partial cross-sectional view showing the cutting blade of the fishing ice hole flaring apparatus of FIGS. 5 and 6 shaving and beveling a cone shape to the bottom end of the ice fishing hole; and FIG. 7D is a partial cross-sectional view showing the removal of the fishing ice hole flaring apparatus from the ice fishing hole.

DESCRIPTION OF THE PREFERRED EMBODIMENT

Figure 4:
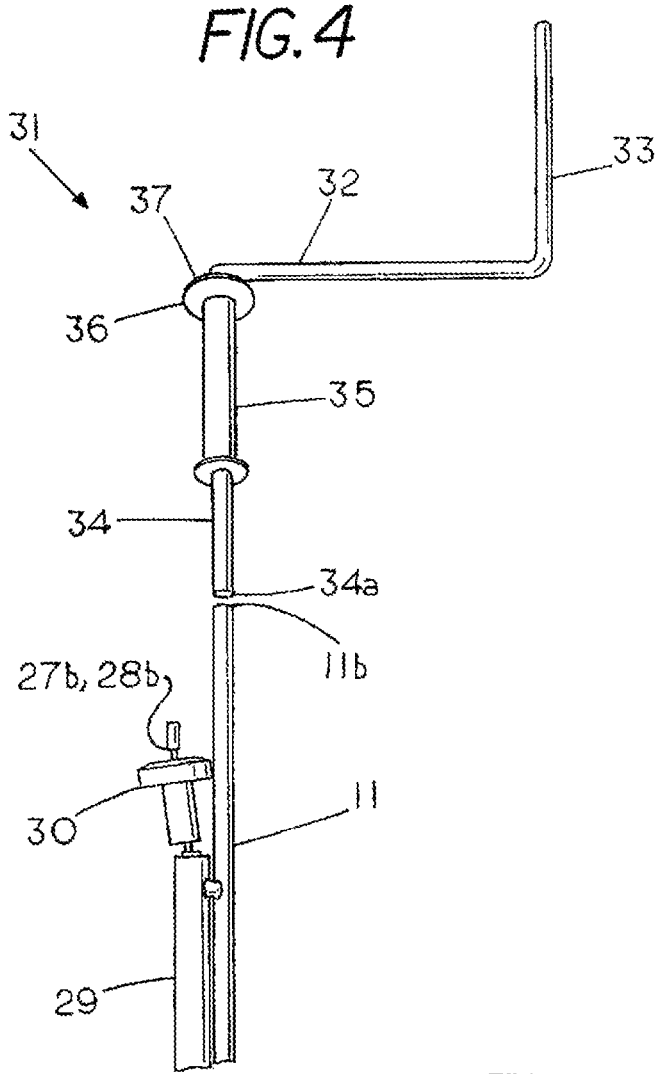
FIG. 4 is a close-up side view showing a z-shaped cranking handle system for rotationally powering the fishing ice hole flaring apparatus of FIG. 1.

The present invention reduces or solves the problem associated with fishing ice holes line and hook snagging problems by proving an improved tool that shaves and bevels a cone shape to the bottom end of a pre-existing ice fishing hole.

FIG. 1 shows 1 is a perspective view showing an embodiment of the present invention comprising a fishing ice hole flaring apparatus 10. Fishing ice hole flaring apparatus 10 generally comprises 2 main pairs, namely a central shaft 11 and a triangular shaped base. In the embodiment of FIG. 1 the triangular shaped base is shown as comprising an isosceles triangle-shaped base 12. FIG. 2 is a close-up perspective view showing triangular shaped base 12 in an in-use cutting position. FIG. 3 is a close-up perspective view showing triangular shaped base 12 in a retracted position.

As shown in FIGS. 2 and 3, triangle-shaped base 12 generally includes a first side 13 connected to a second side 14 to form an apex region 15, and a third side comprising a weight-distributing cross arm 16 further connecting the first side 13 to the second side 14 distal the apex region 15.

The first side 13 of triangle-shaped base 12 includes a pair of opposing side walls 13a and 13b extending from at least a portion of an exterior surface 17 of the first side 13 to form a first U-shaped arm receiving channel 18. Triangle-shaped base 12 also includes a first hinged arm 19 having a first end 19a and a second end 19b with a pivot pin 20 locking the first hinged arm 19 to the first U-shaped arm receiving channel 18 proximal the first end 19a of the first hinged arm 19. Attached proximal to the second end 19b of the first hinged arm 19 is a first cutting blade 21.

The second side 14 of triangle-shaped base 12 also includes a pair of opposing side walls 14a and 14b extending from at least a portion of an exterior surface 22 of the second side 14 to form a second U-shaped arm receiving channel 23. Triangle-shaped base 12 also includes a second hinged arm 24 having a first end 24a and a second end 24b with a second pivot pin 25 locking the second hinged arm 24 to the second U-shaped arm receiving channel 23 proximal the first end 24a of the second hinged arm 24. Although pivot pins are used in the embodiment FIGS. 1-3 to attach hinged arms 19 and 24 to their corresponding U-shaped arm receiving channels 18 and 23, alternative embodiments may include a variety of other securing members including but not limited to nut and bolts, rivets, screws and the like. Attached proximal to the second end 24b of the second hinged arm 24 is a second cutting blade 26, which is shown in FIGS. 1, 2, and 3 facing the same circular or rotational direction as the first cutting blade 21.

In regards to the pair of opposing side walls 13a, 13b and 14a, 14b, in the embodiment of FIGS. 1-3 the pair of opposing side walls 13a, 13b of the first side 12 are shown as comprising diametrically opposing side walls extending the entire length of the exterior surface 17 of the first side 13 to form first U-shaped arm receiving channel 18 and the pair of opposing side walls 14a, 14b of the second side 14 are shown as comprising diametrically opposing side walls 14a, 14b extending the entire length of the exterior surface 22 of the second side 14 to form second U-shaped arm receiving channel 23. In addition, although the embodiment of FIGS. 1-3 show fishing ice hole flaring apparatus 10 as having a pair of arms each having a cutting blade attached thereto, alternative embodiment of the present invention may comprise a fishing ice hole flaring apparatus having as few as 1 arm and blade to a plurality of arm with corresponding blades, including but not limited to a 3, 4, or more blade apparatus.

Referring to FIG. 1 the central shaft 11 generally comprises a first end 11a and a second end 11a with the central shaft 11 extending through the apex region 15 of the triangle-shaped base 12 with the first end 11a of central shaft 11 secured to the weight-distributing cross arm 16, and preferably secured to the weight-distributing cross arm at a 90 degrees angle. In regards to the second end 11b of central shaft 11, second end of the central shaft includes a lockable member for engaging a corresponding locking member of an extension shaft to increasing the working length of the apparatus or to a corresponding locking member of a hand powered or electrically powered rotary tool. It is noted that the lockable member may comprise but is not limited to a variety of locking or connection mechanism including a locking pin mechanism, a male-female screw-on and off mechanism, a male-female frictional fit mechanism.

The fishing ice hole flaring apparatus 10 also includes a first retraction cable 27 and a second retraction cable 28 loosely attached to a portion of the central shaft with each of the retraction cables 27, 28 having a first end 17a, 28a and a second 27b, 28b. The first end 27a of the first retraction cable 27 is shown in FIGS. 2 and 3 attached to a portion of the first hinged arm 19 and the first end 28a of the second retraction cable 28 is shown attached to a portion of the second hinged arm 24.

In the embodiment of FIGS. 1-3 the fishing ice hole flaring apparatus 10 is shown including an optional cable housing 29 attached to a portion of the central shaft 11 and running parallel to the central shaft 11 with the cable housing 29 supporting a portion of each of the retraction cables 27, 28 located between the ends 27a, 28a and 227b, 28b of the retraction cables therein. Fishing ice hole flaring apparatus 10 also includes a cable retraction knob 30 attached to the second ends 27b, 28b of the retraction cables 27, 28. The cable retraction knob 30 operate to pivotably move the hinged arms 19, 24 between the retracted position and the in use cutting position.

That is, when the operator pulls the cable via retraction knob 30 the hinged arms 19, 24 are operated to fold upwards toward the central shaft 11 of the fishing ice hole flaring apparatus 10 from the in use cutting position to the retracted position. It is noted that in the retracted position the triangle-shaped base 12 of the fishing ice hole flaring apparatus 10 is allowed to be inserted and removed from an ice fishing hole without getting stuck to bottom end or the sidewalls of the fishing ice hole. When the retraction cables 27, 28 are pushed back down the central shaft 11 via retraction knob 30, the gravitational force acting on the natural weight of each of the hinged arms 19, 24 will assist the hinged arms 19, 24 operating to move downwards until they engage their corresponding U-shaped arm receiving channels 18, 23.

Referring to FIG. 4, FIG. 4 shows an optional hand powered rotary tool of the present invention comprising a z-shaped cranking handle system 31 for rotationally powering the fishing ice hole flaring apparatus 10. Z-shaped cranking handle system 31 includes a main body 32, a cranking handle 33 extending in a preferably perpendicular direction from the main body 32 and a connection handle 34 extending from the main body 32 in a direction opposite the cranking handle 33 with the connection handle 34 having a free end 34a detachably connectable to the second end 11b of the central shaft 11 such as through the use of the above-described lockable member.

Z-shaped cranking handle system 31 is shown including a hand supporting sleeve 35 located about a portion of the connection handle 34. A feature of the hand supporting sleeve 35 is that the hand supporting sleeve 35 includes an upward applied force supporting enlarged end 36 having a friction reducing rigid end surface 37 for engaging a portion of the main body. That is unlike currently known ice hole flaring devices, the fishing ice hole flaring apparatus 10 of the present invention uses an upward applied force to assist the user in rotationally shaving and beveling a cone shape to the bottom end of a pre-existing ice fishing hole. The upward applied force is applied by the user pulling the hand supporting sleeve 35 against the main body of the Z-shaped cranking handle system 31. By having the enlarged end 36, more upward force may be distributed against the main body of the Z-shaped cranking handle system 31. The present of the friction reducing rigid end surface 37 allows the user to more freely rotate the cranking handle 33 about a circular axis of fishing ice hole flaring apparatus 10 compared to a pliant or soft end surface. It is noted that the friction reducing rigid end surface 37 may further include a friction reducing coating such as various polymer additives and films to further increase the free rotational movement of the cranking handle 33 about the circular axis of fishing ice hole flaring apparatus 10.

Figure 5:
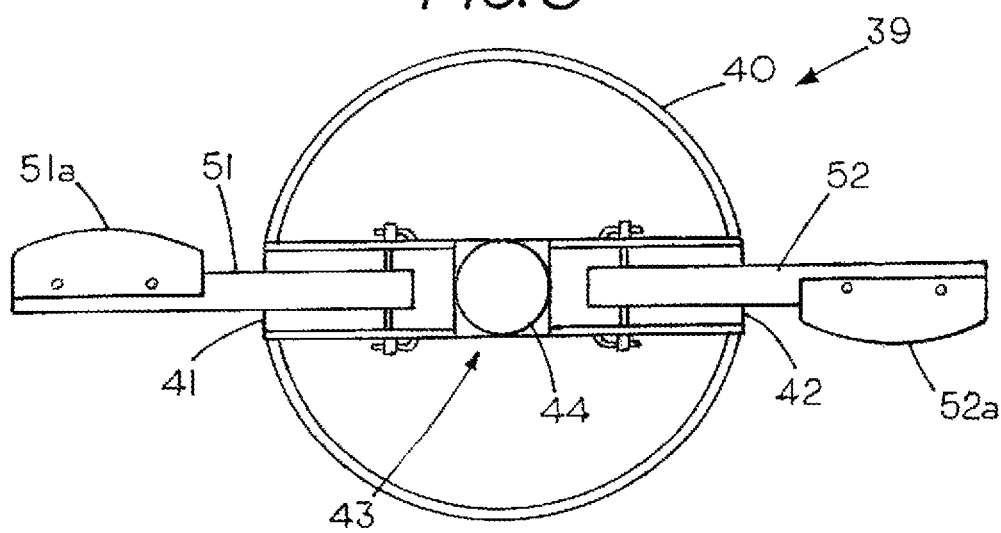
FIG. 5 is a close-up top view a fishing ice hole flaring apparatus having a centrifugal force balancing and centering ring in an in-use cutting position.

Referring to FIGS. 5 and 6, FIG. 5 is a close-up top view and FIG. 6 is a close-up perspective view of an alternative embodiment of a fishing ice hole flaring apparatus 38 of the present invention with FIG. 5 showing the fishing ice hole flaring apparatus 38 in an in-use cutting position and FIG. 6 showing the fishing ice hole flaring apparatus 38 in a retracted position cutting position.

It is noted that fishing ice hole flaring apparatus 38 includes most if not all of the corresponding components to fishing ice hole flaring apparatus 10 shown in FIGS. 1-5. However, fishing ice hole flaring apparatus 38 further includes a triangular shaped base 39 having a centrifugal force balancing and centering ring 40 connected to a first side 41 and second side 42 of the triangular shaped base 39 distal an apex region 43 of the triangular shaped base 39.

Centrifugal force balancing and centering ring 40 functions by using a weighted balanced natural force of gravity to keep fishing ice hole flaring apparatus 38 automatically centered in the middle of the ice hole so that the fishing ice hole flaring apparatus 38 does not wobble or jump around to not only provide for a clean smooth cone shape to the bottom end of a pre-existing ice fishing hole but to also reduce wear and tear not only to the fishing ice hole flaring apparatus 38 but also to the user's operating body parts including the user's arms and joints.

FIGS. 7A-7D are partial cross-sectional views showing the use of fishing ice hole flaring apparatus 38 in shaving and beveling a cone shape to a bottom end of a pre-existing ice fishing hole 45.

In the operation of fishing ice hole flaring apparatus 38, the user pulls a cable retraction knob, similar to cable retraction knob 30, in the upward position to cause the hinged arms 51 and 52 to be retracted toward the central shaft 44 of fishing ice hole flaring apparatus 38.

As shown in FIGS. 7a and 7B the triangular shaped base 39 of fishing ice hole flaring apparatus 38 is then inserted into pre-drilled ice fishing hole 45. The triangular shaped base 39 is then lowered into ice fishing hole 45 until the triangular shaped base 39 is below the bottom surface 45a of the ice 46.

The user then pushes down on the retraction knob which results in the retraction cables 47, 48 to slide downward. The downward movement of retraction cables 47, 48 causes the hinged arms 51, 52 with their corresponding attached cutting blades 51a, 52a to fall or lowered and rest on their corresponding U-shaped arm receiving channels 49, 50 (see FIG. 6), such as but not limited to a downward 45 degree angle.

The user then pulls fishing ice hole flaring apparatus 38 gently upward until the cutting blades 51a, 52a make contact with the bottom surface 45a of the ice 46. In the embodiment of FIGS. 5-7D, because the blades are at a 45 degree angle and the triangular shaped base 39 includes centrifugal force balancing and centering ring 40, the triangular shaped base 39 will automatically center itself in the center of the predrilled ice fishing hole 45.

With gentle upward pressure applied to main body 32 of Z-shaped cranking handle system 31 by hand supporting sleeve 35, the user simultaneously rotates the cranking handle 33 about a circular axis or uses a power head to turn the fishing ice hole flaring apparatus 38 and begin shaving and beveling a cone shape to the bottom end of pre-existing ice fishing hole 45. It is noted that unlike the present invention, prior art ice bevel tools that uses other types of handles such as a T-handle does not allow the user to simultaneously pull up on the tool and turn or rotate the tool.

The operator rotates the fishing ice hole flaring apparatus 38 until he/she can no longer feel the ice being shaved away by the cutting blades 51a, 52a, which on average usually takes about 6 rotations. At this point a cone shaped bevel 53 has been cut at the bottom 45a of the ice fishing hole 45 as shown in FIGS. 7C and 7D.

To retract the fishing ice hole flaring apparatus 38 until from the ice fishing hole 45 the user lowers the triangular shaped base 39 of the fishing ice hole flaring apparatus 38 below the bottom surface 45a of the ice 46, preferably approximately 6 inches or more below the bottom surface 45a of ice 46 hole to allow for clearance enabling the movement of the hinged arms 51 and 52 to the retracted position. The user then pulls upward on the retraction knob causing the retraction cables 47, 48 to raise the hinged arms to the retracted position thereby enabling the user to remove the fishing ice hole flaring apparatus 38 from the ice fishing hole.

I claim:
1. A fishing ice hole flaring apparatus comprising:
a triangle-shaped base having a first side connected to a second side to form an apex region, and a third side comprising a weight-distributing cross arm further connecting the first side to the second side distal the apex region;

the first side of triangle-shaped base including a pair of opposing side walls extending from a first bottom channel wall to form a first U-shaped arm receiving channel;

a first hinged arm having a first end and a second end with a first pivot pin locking the first hinged arm to the first U-shaped arm receiving channel proximal the first end of the first hinged arm;

a first cutting blade attached to the second end of the first hinged arm and facing a circular direction;

the second side of triangle-shaped base including a pair of opposing side walls extending from a second bottom channel wall to form a second U-shaped arm receiving channel;

a second hinged arm having a first end and a second end with a second pivot pin locking the second hinged arm to the second U-shaped arm receiving channel proximal the first end of the second hinged arm;

a second cutting blade attached to the second end of the second hinged arm with the second blade facing the same circular direction as the first cutting blade;

a central shaft having a first end and a second end, the central shaft extending through the apex region of the triangle-shaped base proximal the first end and secured to the weight-distributing cross arm;

a first retraction cable and a second retraction cable, the retraction cables each having a first end and a second end with the first end of the first retraction cable attached to a portion of the first hinged arm and the first end of the second retraction cable attached to a portion of the second hinged arm;

a cable housing attached to a portion of the central shaft and running parallel to the central shaft, the cable housing supporting a portion of each of the retraction cables located between the ends of the retraction cables therein;

a cable retraction knob attached to the second ends of the retraction cables, the cable retraction knob operable to pivotably move the hinged arms between a retracted position and an in use cutting position; and a z-shaped cranking handle system having main body, a cranking handle extending in a perpendicular direction from the main body and a connection handle extending from the main body in a direction opposite the cranking handle with the connection handle having a free end detachably connectable to the second end of the central shaft.

2. The fishing ice hole flaring apparatus of claim 1 wherein the pair of opposing side walls of the first side comprises diametrically opposing side walls extending from the entire length of the first bottom channel wall of the first side to form the first U-shaped arm receiving channel and the pair of opposing side walls of the second side comprises diametrically opposing side walls extending from the entire length of the second bottom channel wall of the second side to form the second U-shaped arm receiving channel.

3. The fishing ice hole flaring apparatus of claim 1 wherein the triangular-shaped base comprises an isosceles triangle-shaped base.

4. The fishing ice hole flaring apparatus of claim 1 including a centrifugal force balancing and centering ring connected to the first and second sides of the base distal the apex region.

5. The fishing ice hole flaring apparatus of claim 1 wherein the second end of the central shaft includes a lockable member for connection to a rotary tool.

6. The fishing ice hole flaring apparatus of claim 1 wherein the second end of the central shaft includes a lockable member for engaging a corresponding locking member of an extension shaft to increasing the working length of the apparatus.

7. The fishing ice hole flaring apparatus of claim 1 including a hand supporting sleeve located about a portion of the connection handle, the hand supporting sleeve having an upward applied force supporting enlarged end, the enlarged end including a friction reducing rigid end surface for engaging a portion of the main body.

8. A fishing ice hole flaring apparatus comprising:

a triangle-shaped base having a first side connected to a second side to form an apex region, and a third side comprising a weight-distributing cross arm further connecting the first side to the second side distal the apex region;

the first side of triangle-shaped base including a pair of opposing side walls extending from a first bottom channel wall to form a first U-shaped arm receiving channel;

a first hinged arm having a first end and a second end with a first pivot pin locking the first hinged arm to the first U-shaped arm receiving channel proximal the first end of the first hinged arm;

a first cutting blade attached to the second end of the first hinged arm and facing a circular direction;

the second side of triangle-shaped base including a pair of opposing side walls extending from a second bottom channel wall to form a second U-shaped arm receiving channel;

a second hinged arm having a first end and a second end with a second pivot pin locking the second hinged arm to the second U-shaped arm receiving channel proximal the first end of the second hinged arm;

a second cutting blade attached to the second end of the second hinged arm with the second blade facing the same circular direction as the first cutting blade;

a central shaft having a first end and a second end, the central shaft extending through the apex region of the triangle-shaped base proximal the first end, the central shaft extending through the apex region of the triangle-shaped base proximal the first end and secured to the weight-distributing cross arm;

a first retraction cable and a second retraction cable, the retraction cables each having a first end and a second end with the first end of the first retraction cable attached to a portion of the first hinged arm and the first end of the second retraction cable attached to a portion of the second hinged arm;

a cable housing attached to a portion of the central shaft and running parallel to the central shaft, the cable housing supporting a portion of each of the retraction cables located between the ends of the retraction cables therein; and a cable retraction knob attached to the second ends of the retraction cables, the cable retraction knob operable to pivotably move the hinged arms between a retracted position and an in use cutting position.

9. The fishing ice hole flaring apparatus of claim 8 wherein the central shaft is secured to the weight-distributing cross arm at a 90 degrees angle.

10. The fishing ice hole flaring apparatus of claim 8 wherein the pair of opposing side walls of the first side comprises diametrically opposing side walls extending from the entire length of the first bottom channel wall of the first side to form the first U-shaped arm receiving channel and the pair of opposing side walls of the second side comprises diametrically opposing side walls extending from the entire length of the second bottom channel wall of the second side to form the second U-shaped arm receiving channel.

11. The fishing ice hole flaring apparatus of claim 9 wherein the triangular-shaped base comprises an isosceles triangle-shaped base.

12. The fishing ice hole flaring apparatus of claim 10 including a centrifugal force balancing and centering ring connected to the first and second sides of the base distal the apex region.

13. The fishing ice hole flaring apparatus of claim 10 wherein the second end of the central shaft includes an adapter for connection to a rotary tool.

14. The fishing ice hole flaring apparatus of claim 10 wherein the second end of the central shaft includes a lockable member for engaging a corresponding locking member of an extension shaft to increasing the working length of the apparatus.

15. The fishing ice hole flaring apparatus of claim 10 including a z-shaped cranking handle system having main body, a cranking handle extending in a perpendicular direction from the main body and a connection handle extending from the main body in a direction opposite the cranking handle with the connection handle having a free end detachably connectable to the second end of the central shaft.

16. The fishing ice hole flaring apparatus of claim 10 including a hand supporting sleeve located about a portion of the connection handle, the hand supporting sleeve having an upward applied force supporting enlarged end, the enlarged end including a friction reducing rigid end surface for engaging a portion of the main body.

17. A fishing ice hole flaring apparatus comprising:
an isosceles triangle-shaped base having a first side connected to a second side to form an apex region, and a third side comprising a weight-distributing cross arm further connecting the first side to the second side distal the apex region;
a centrifugal force balancing and centering ring connected to the first and second sides of the base distal the apex region;
the first side of triangle-shaped base including a pair of diametrically opposing side walls extending from a first bottom channel wall to form a first U-shaped arm receiving channel;
a first hinged arm having a first end and a second end with a first pivot pin locking the first hinged arm to the first U-shaped arm receiving channel proximal the first end of the first hinged arm;
a first cutting blade attached to the second end of the first hinged arm and facing a circular direction;
the second side of triangle-shaped base including a pair of diametrically opposing side walls extending from a second bottom channel wall to form a second U-shaped arm receiving channel;
a second hinged arm having a first end and a second end with a second pivot pin locking the second hinged arm to the second U-shaped arm receiving channel proximal the first end of the second hinged arm;
a second cutting blade attached to the second end of the second hinged arm with the second blade facing the same circular direction as the first cutting blade;
a central shaft having a first end and a second end, the central shaft extending through the apex region of isosceles triangle-shaped base proximal the first end and secured to the weight-distributing cross arm at a 90 degrees angle;
a first retraction cable and a second retraction cable, the retraction cables each having a first end and a second end with the first end of the first retraction cable attached to a portion of the first hinged arm and the first end of the second retraction cable attached to a portion of the second hinged arm;
a cable housing attached to a portion of the central shaft and running parallel to the central shaft, the cable housing supporting a portion of each of the retraction cables located between the ends of the retraction cables therein;
a cable retraction knob attached to the second ends of the retraction cables, the cable retraction knob operable to pivotably move the hinged arms between a retracted position and an in use cutting position;
a z-shaped cranking handle system having main body, a cranking handle extending in a perpendicular direction from the main body and a connection handle extending from the main body in a direction opposite the cranking handle with the connection handle having a free end detachably connected to the second end of the central shaft; and
a hand supporting sleeve located about a portion of the connection handle, the hand supporting sleeve including an upward applied force supporting enlarged end, the enlarged end including a friction reducing rigid end surface for engaging a portion of the main body.

* * * * *